UNITED STATES PATENT OFFICE.

ANSIL MOFFATT, OF INDIANAPOLIS, INDIANA, ASSIGNOR TO ALBA MANUFACTURING COMPANY, OF INDIANAPOLIS, INDIANA, A CORPORATION OF INDIANA.

PROCESS FOR PRODUCING COMPOSITE PIGMENTS.

No. 911,833.　　　Specification of Letters Patent.　　　Patented Feb. 9, 1909.

Application filed January 7, 1908. Serial No. 409,675.

*To all whom it may concern:*

Be it known that I, ANSIL MOFFATT, a citizen of the United States, residing at Indianapolis, in the county of Marion and State of Indiana, have invented certain new and useful Improvements in Processes for Producing Composite Pigments, of which the following is a specification.

My invention consists in a process for producing a composite white pigment consisting of zinc oxid and barium sulfate in a state of co-precipitation.

It is well known that composite pigments or rather pigments of a composite nature, are inferior in use for painting to pigments of simple nature, in body and covering power, unless the components of the composite pigment are produced simultaneously, either by co-precipitation or by co-reaction, in which case they invariably surpass those of simple nature as well as their individual constituents in the desired qualities. For example, the pigment called in trade lithopone owes its value to the fact that its components are co-precipitated. It is made by mixing solutions of barium sulfid and zinc sulfate whereby the bases exchange acids and the result is a co-precipitated pigment of barium sulfate and zinc sulfid in molecular proportions, the resulting pigment surpassing either of its constituents in painting or pigment value. Also, the pigment well known as "white lead" is a composite pigment of lead carbonate and hydrate co-generated.

The pigment formed by my process would most naturally be made by mixing solutions of barium oxid and zinc sulfate, but as barium oxid (or hydrate), is an article of relatively high cost, the price of a pigment so produced would restrict its use in commerce. By my process I am able to take barium chlorid or other soluble salt of barium for the production of my pigment, and barium chlorid especially is an article procurable in commerce in a state of purity and cheapness and in abundance.

In carrying out my process in the preferred way, I proceed as follows: For each 1000 parts by weight of pigment to be produced, I take 914 parts by weight of zinc sulfate ($ZnSO_4, 7H_2O$), or its equivalent and dissolve in water. I then take 178 parts by weight of pure oxid of calcium or its equivalent, and mix to a smooth milk with water. I then mix the two solutions or mixtures thoroughly, and complete the reaction, if necessary, by means of heat. I leave the mixture for some time, to complete the reaction, or insure its completeness, whereby I have co-precipitated zinc oxid and calcium sulfate, according to the equation:

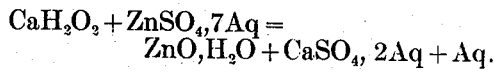

This sulfate of calcium has then the formula $CaSO_4, 2H_2O$, which has a molecular volume having practically the same ratio to that of barium sulfate as the ratio of volumes of the respective metals. This being the case, on now adding to the co-precipitated mixture of zinc oxid and calcium sulfate, 776 parts by weight, of barium chlorid, the barium and calcium exchange places.

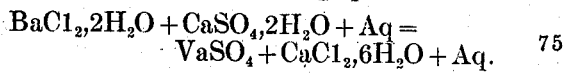

This results in the formation of calcium chlorid and barium sulfate, the latter salt being in effect thus co-precipitated with the zinc oxid since no material disturbance of molecular volumes has resulted. I then allow the mixture to stand some time to complete the interchange, after which the calcium chlorid is removed by washing. When the washing is completed, the precipitated pigment, now composed of zinc oxid and barium sulfate in molecular proportions and co-precipitated, is drained and dried.

Having thus fully described my invention, what I claim as new and wish to secure by Letters Patent of the United States, is—

In a process for producing a composite pigment, the process of co-precipitating zinc oxid and calcium sulfate by mutual reaction of zinc sulfate and calcium oxid, both in solution, and then acting on the co-precipitated salts with barium chlorid in solution whereby barium sulfate is produced in a relation of co-precipitation to the zinc oxid.

In witness whereof, I, have hereunto set my hand and seal at Indianapolis, Indiana, this 31st day of December, A. D. one thousand nine hundred and seven.

ANSIL MOFFATT. [L. S.]

Witnesses:
　J. A. MINTURN,
　F. W. WOERNER.